United States Patent Office 3,549,638
Patented Dec. 22, 1970

3,549,638
UNSATURATED SULFONE COMPOUNDS CONTAINING A HETEROCYCLIC STRUCTURE
Giuliana C. Tesoro, Dobbs Ferry, N.Y., and Frank V. Mattei, Plainfield, N.J., assignors to J. P. Stevens & Co., Inc., New York, N.Y., a corporation of Delaware
No Drawing. Original application May 5, 1961, Ser. No. 107,893, now Patent No. 3,441,954, dated Apr. 29, 1969. Divided and this application Sept. 24, 1968, Ser. No. 798,487
Int. Cl. C07d *51/70*
U.S. Cl. 260—268                                    1 Claim

ABSTRACT OF THE DISCLOSURE

Unsaturated sulfone compounds containing a heterocyclic structure represented by the formula:

$$(CH_2\!=\!CHSO_2CH_2CH_2N)_2Y$$

wherein Y is a part of the heterocyclic ring in which the two nitrogen atoms are also a part are disclosed. These compounds are useful for the crosslinking of polymers containing active hydrogen atoms and particularly for the crosslinking of textile materials.

---

The present application is a divisional of application Ser. No. 107,893 filed May 5, 1961, now U.S. Pat. 3,441,954.

The present invention relates to new unsaturated sulfone compounds and methods of preparation thereof. It also relates to the products resulting from the reaction of the sulfone compounds of the present invention with polymeric materials, and methods of preparing said reaction products.

It is known that unsaturated sulfones, such as divinyl sulfone, are useful in enhancing the properties of natural and synthetic polymers containing active hydrogen atoms. Examples of such polymers include cotton, rayon, wool, polyvinyl alcohol, starch, and the like. The use of divinyl sulfone on an industrial scale for such purpose has been limited due to objectionable physicochemical and physiological properties of this reagent. For example, divinyl sulfone is extremely toxic to humans not only if ingested but also by simple absorption through the skin. In addition the compound is a strong lachrymator and vesicant. It is also difficult to handle because of its relatively high vapor pressure. Moreover, at alkaline pH, particularly 9.0 and above, divinyl sulfone reacts readily with water so that aqueous alkaline solutions of divinyl sulfone have limited stability. Accordingly it is highly desirable to provide sulfones which are free of the aforementioned objections and yet are capable of imparting valuable properties to natural and synthetic polymers containing active hydrogen atoms and particularly to fiber forming polymers.

It is, therefore, an object of this invention to provide novel unsaturated sulfones which enhance the properties of polymers containing active hydrogen atoms and yet are non-irritating, odorless, and have a low vapor pressure.

A further object of this invention is to provide novel unsaturated sulfones which are relatively stable and resistant to self condensation and polymerization.

A further object of this invention is to provide a novel process whereby the unsaturated sulfones of this invention are reacted with polymers containing active hydrogen atoms so as to impart valuable properties thereto such as increased resistance to water, dimensional stability, and when the polymer is in the form of a fabric, improved wet and dry crease recovery.

A further object of this invention is to provide novel products which result from reacting the sulfones of this invention with polymers containing active hydrogen atoms.

These and other objects will be apparent from the description which follows.

The novel sulfone compounds of this invention correspond to the structure:

(I)
$$\left(CH_2\!=\!CHSO_2CH_2CH_2\underset{\underset{R_b^2}{|}}{A}\right)_n\!\!Q$$

where $n$ is an integer number and has a value of 2 to 3; A is selected from the group consisting of oxygen and nitrogen, and does not have any hydrogen atoms attached to it; $R^2$ is a lower alkyl group; Q is an organic radical in which the number of unsatisfied valences is equal to $n$, and $b$ has a value from 0 to 1 but if A is oxygen, then $b$ is 0.

The novel process of this invention including the novel products formed therefrom comprises reacting the compounds of Formula I above with polymers containing active hydrogen atoms in the presence of an alkaline catalyst at temperatures varying from ambient (e.g., 20° C. to 25° C.) to 200° C.

Included among the compounds of Formula I above are, for example, the following:

(II)     $$(CH_2\!=\!CHSO_2CH_2CH_2O)_n Q$$

where $n$ has a value from 2 to 3 and Q is a radical selected from the group consisting of $$(-C_aH_{2a}-)_3\!\!=\!\!N$$

wherein $a$ has a value from 1 to 8; and $$(-C_aH_{2a}-)_2\!\!=\!\!NR$$

wherein $a$ has a value from 1 to 8 and R is an alkyl group.

(III)
$$\left(CH_2\!=\!CHSO_2CH_2CH_2\underset{\underset{R_b^2}{|}}{N}\right)_2\!\!Q$$

where $R^2$ is a lower alkyl group, $b$ has a value from 0 to 1, and Q is a bivalent organic radical selected from the group consisting of the acyclic radicals $$-\underset{\underset{X}{\|}}{C}-$$

wherein X is selected from the group consisting of oxygen and sulfur, and $$-C_aH_{2a}$$

wherein $a$ has a value of 2 to 10.

Compounds contemplated by Formula II include those of Formulas IV, V, and VI as follows:

(IV)
$$CH_2\!=\!CHSO_2CH_2CH_2N\!\!\begin{array}{c}CH_2\!-\!CH_2\\ \diagup\qquad\diagdown\\ \diagdown\qquad\diagup\\ CH_2\!-\!CH_2\end{array}\!\!N\!-\!CH_2CH_2SO_2CH\!=\!CH_2$$

(V)  $$CH_2\!=\!CHS\,O_2CH_2N\!\!-\!\!R'\!\!-\!\!N\!\!-\!\!CH_2CH_2S\,O_2CH\!=\!CH_2$$
$$\qquad\qquad\qquad\quad\;|\qquad\;\;|$$
$$\qquad\qquad\qquad\;R''\quad R'''$$

where R′ is a bivalent organic radical and R″ and R‴ are lower alkyl groups. In the foregoing formula, the group $$-N\!\!-\!\!R'\!\!-\!\!N\!\!-$$
$$\;|\qquad\;\;|$$
$$R''\quad R'''$$

can be the residue of a bis secondary amine, $$HN\!\!-\!\!R'\!\!-\!\!N\!\!-\!\!H$$
$$\;|\qquad\;\;|$$
$$R''\quad R'''$$

(VI)
$$CH_2\!=\!CHS\,O_2CH_2CH_2N\overset{\overset{X}{\|}}{C}NCH_2CH_2S\,O_2CH\!=\!CH_2$$
$$\qquad\qquad\qquad\qquad\;|\qquad\;\;|$$
$$\qquad\qquad\qquad\qquad R''\;\;R'''$$

where R″ and R‴ are lower alkyl groups and X is selected from the group consisting of oxygen and sulfur.

(VII)   $(CH_2=CHSO_2CH_2CH_2N<)_2Y$ where Y is part of a heterocyclic ring of which the two nitrogens are also a part.

(VIII)
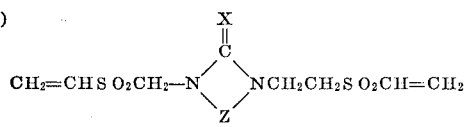

where X has the same meaning as in Formula VI, and the two nitrogen atoms are part of a heterocyclic ring Z of which the grouping =C=X is also a part.

Specific examples of Formula VIII include:

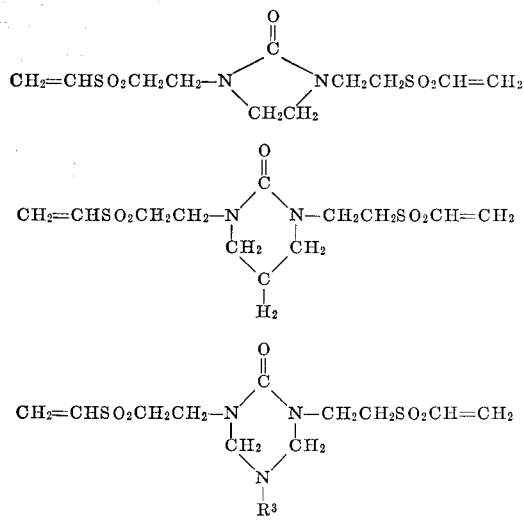

where $R^3$ is a lower alkyl.

The sulfone compounds of Formula I can be prepared by the addition of divinyl sulfone to polyfunctional hydroxyl, amino, amido and thioamido compounds of suitable structure using at least two mols of divinyl sulfone for each mol of hydroxyl, amino, amido or thioamido compound.

For example, the product of Formula II where $a=2$ can be prepared from three mols of divinyl sulfone and one mol of triethanolamine. The product of Formula III where $a$ is 2 and R is methyl can be prepared from two mols of divinyl sulfone and one mol of N-methyl diethanolamine. Similarly the product of Formula IV is obtained from a 2/1 mol ratio of dinvyl sulfone to piperazine, and the products of Formula V can be obtained from a 2/1 mol ratio of divinyl sulfone to a bis-secondary amine. In all instances, a larger excess of divinyl sulfone can be used for the synthesis and later removed by distillation, but at least two mols of the divinyl sulfone must be used in order to avoid the formation of polymeric materials and saturated by-products.

The reactions employed for the synthesis for the new sulfone compounds can be represented by a generic Equation 1

(1)
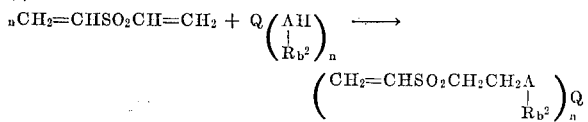

in which $n$, $b$, A, $R^2$ and Q have the same meaning as in Formula I.

The conditions under which reaction (1) takes place depend greatly on the structure of the groupings A and Q. Basic compounds (compounds $$Q\begin{pmatrix}AH\\|\\R_b^2\end{pmatrix}_n$$

in which amino groups are present) react readily at room temperature in the absence of a catalyst. Neutral compounds on the other hand add to the divinyl sulfone to give the desired products only in the presence of alkaline catalysts and at elevated temperature. The presence of solvent is not essential, but often desirable in order to facilitate the control of temperature during the reaction and the isolation of the reaction products.

The new sulfone compounds of the present invention, as represented by Formula I, have the following important structural features:

(a) They contain at least two vinyl sulfone groups $-SO_2CH=CH_2$ which are capable of addition to compounds containing active hydrogen in the presence of catalytic amounts of alkaline materails.

(b) They do not contain active hydrogen atoms in the molecule and are not prone to self condensation and polymerization.

(c) They are solids or liquids of very low vapor pressure, odorless and non-irritating (in constrast with divinyl sulfone itself).

(d) They are stable to hydrolysis in neutral, acidic and weakly alkaline aqueous solutions.

Due to these properties, the sulfones are desirable reagents for the chemical modification, and more specifically for the crosslinking of polymers containing active hydrogen atoms. The reaction products of the new sulfone with textile fibers are particularly important and exhibit many desirable properties. It is known that the properties of textile materials can be enhanced by crosslinking reactions. The dimensional stability, resilience, water resistance, and flat drying properties can be improved by crosslinking treatments and many processes are known by which crosliking can be achieved. By the use of the new sulfones, products of outstanding properties can be obtained under practical conditions, and the disadvantages of known processes cna be minimized.

The processes by which polymers containing active hydrogen atoms, and more particularly textile materials can be treated with the new sulfones, consist of alkali catalysed reactions in which crosslinking takes place by addition of the vinyl groups to the active hydrogen atoms of the polymer. These reactions can be carried out at temperatures from ambient temperature to 200° C., depending on the amount and basic strength of the alkaline catalyst. They can be carried out in the presence or in the absence of water or solvent, and the preferred conditions for the reaction are generally dictated by the specific polymer being reacted. When the polymer has a tendency to be degraded by strong alkaline solutions, as for example in the case of wool fiber, weakly alkaline catalysts are preferred. When the polymer is not attacked by alkali, strong bases can be used to achieve rapid reaction at low temperature.

The hydroxides, phosphates, carbonates, bicarbonates, silicates and acetates of alkali metals are suitable catalysts for the reactions. Quaternary ammonium hydroxides and other non-volátile organic bases can also be used.

The reaction products obtained from the polymer and the novel sulfones of Formula I are new polymeric products formed in accordance with a generic Equation 2.

(2)
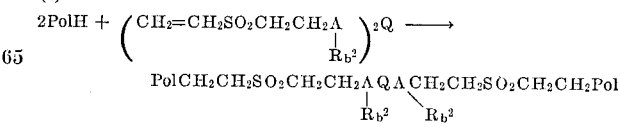

in which A, $R^2$, $b$ and Q have the same meaning as in Formula I, $n$ is 2 and "PolH" is used to designate a polymer molecule containing active hydrogen atoms.

When the active hydrogen atoms of the polymer are part of hydroxyl groups, as for example in the case of cellulose, the products formed contain ether groupings as shown in Equation 3.

(3)
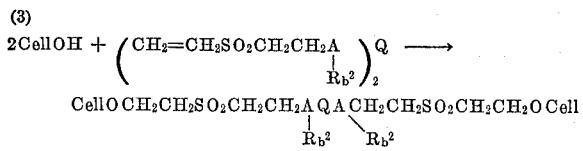

in which "CellOH" is used to designate a cellulose molecule.

The properties of the new crosslinked polymeric products depend in part on the amount and structure of the crosslinking agent employed for their preparation, and especially on the structure of the groupings A and Q. Some of these properties will be illustrated by the examples which follow.

EXAMPLE 1

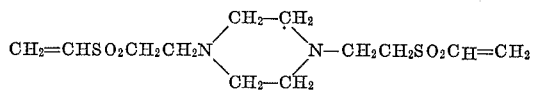

One mole of divinyl sulfone (118 g.) and 350 ml. ether were placed in a 3 neck flask. To this was added dropwise, with stirring and cooling to between 20–30° C., a solution of 0.5 mole (43 g.) of piperazine in 43 g. methanol (preheated to 40–50° C. to dissolve).

The solution of piperazine in methanol was added over a 30 minute period. The resulting slurry of white crystals in ether was filtered, and the filter cake washed with ether and dried of solvent in a desiccator. This preparation gave an 88% yield. A preparation in which 7 mols of divinyl sulfone were reacted with 3 mols of piperazine by the same procedure, gave a 92% yield. When the ether was replaced with benzene, the yield of product was only 37% of the theoretical.

The percent sulfur content of the product of Example 1 was 19.96% (theory=19.86%). The melting point of the product of Example 1 was 115°–117° C. The product was a white crystalline solid, moderately soluble in water and very soluble in acetone and acetone/water mixtures.

The dihydrochloride of the product could be easily prepared by addition of anhydrous HCl to a solution of the material in inert solvent. The percent chloride of the dihydrochloride was 17.3%! (theory=17.9%).

EXAMPLE 2

The product of Example 1 was also prepared by the following procedure—3 moles of divinyl sulfone (354 g.) were dissolved in 1062 g. of a 4:1 dioxane:water mixture (by weight), in a 3 neck flask. To this was added, slowly, with agitation, and cooling to below 40° C., a solution of 1.5 moles (129 g.) of piperazine in 387 g. of the same solvent mixture. The piperazine solution was added over a period of 30 minutes. The solution so obtained contained 25% of the desired product. It was clear yellow and remained clear even after storing at room temperature for a month.

EXAMPLE 3

$$CH_2=CHSO_2CH_2CH_2N-CS-N-CH_2CH_2SO_2CH=CH_2$$
$$\qquad\qquad\qquad\quad | \qquad\quad |$$
$$\qquad\qquad\qquad C_4H_9 \quad\; C_4H_9$$

1 mole (118 g.) of divinyl sulfone and 300 ml. of dioxane were placed in a 3 neck flask and heated to reflux. To this was added, dropwise, with stirring, a solution of 1 g. metallic sodium, 0.5 mole dibutylthiourea (94 g.) in 100 f. of dioxane. The dibutylthiourea solution was added during a period of 2 hours, and the solution was refluxed for an additional four hours after completing the addition. The reflux temperature was from 103°–106° C. The preparation was stripped of solvent from 32% solids to 89% solids at a maximum pot temperature of 112° C. at 25 mm. The vinyl content of the residue (determined by analysis using the method based on addition of lauryl mercaptan) was 11.8% (theory 11.3%).

EXAMPLE 4

$$CH_2=CHSO_2CH_2CH_2N-CO-N-CH_2CH_2SO_2CH=CH_2$$
$$\qquad\qquad\qquad\quad | \qquad\quad |$$
$$\qquad\qquad\qquad\; CH_3 \quad\;\; CH_3$$

5 moles of divinyl sulfone (590 g.) and 300 g. of dioxane were placed in a flask and heated to refluxing. In a separate flask, 1 gram metallic sodium was dissolved in a solution of 0.5 mole (44 g.) of dimethylurea in 100 g. of dioxane (heated to dissolve). The latter solution was added dropwise, with stirring, to the former over an interval of 45 minutes. The reflux temperature was 116° C. The total solids content after completing the addition was 15.7%.

After completing addition of the dimethylurea solution, the clear solution was refluxed for 5 hours. The preparation was then stripped to maximum pot temperature of 121° C. at 25 mm. to remove solvent and excess divinyl sulfone. The residue so obtained, consisting of crude product contained 18% vinyl groups (determined by analysis with mercaptan), while the calculated vinyl content was 16.7%. The crude product was a semi-crystalline mass which could be purified by crystallization.

EXAMPLE 5

3 moles of divinyl sulfone (354 g.) and 700 g. of dioxane were placed in a 3 neck flask and heated to refluxing. In a separate flask, 0.075 mole of metallic sodium (1.7 g.) were dissolved in a solution of 1 mole triethanolamine (149 g.) in 100 g. dioxane (heated to accelerate solution). The latter solution was added dropwise to the former, with agitation, during an interval of 1 hour. Total solids=38.6%. The reflux temperature was 103°–107° C. At this point, the solution contained a small quantity of solids which were filtered off. No further precipitation occurred in the filtrate on standing. The vinyl content (determined by the mercaptan method) gave 5.7% vinyl for this solution. The reaction mixture was stripped of solvent under reduced pressure. The residue, containing 100% solids, had a vinyl content of 13.75%. (Theory for 100% solids at 100% reaction=16.1%; theory for 100% solids at 0% reaction=32.2% vinyl.) The crude product was a viscous syrupy liquid.

EXAMPLE 6

A sample of cotton fabric (80 x 80 print cloth) was impregnated on a laboratory padder with the 25% solution prepared as described in Example 2. The wet pickup was 80%. The fabric was dried, then padded with a 0.5% sodium hydroxide solution and allowed to stand at room temperature wet for 1 hour. After neutralizing and washing, the fabric exhibited excellent crease recovery and flat drying properties. The weight increase of the fabric was 8.5%, indicating that 42% of the sulfone applied had reacted with the cotton. The nitrogen and sulfur analyses of the treated cotton fabric confirmed these values. The physical properties of the treated fabric were as follows:

|  | Warp tear [a] strength, lbs. | Crease recovery degrees [b] | |
|---|---|---|---|
|  |  | Wet | Dry |
| Example 6 | 1, 4 | 282 | 218 |
| Untreated control | 1, 6 | 149 | 162 |

[a] Tested by the Elmendorf Method (ASTM D-1424-59).
[b] Tested by the Monsanto Method (AATCC 66-1959) expressed as the sum of results obtained in the warp and filling directions.

It is interesting to note that the extraordinary improvements in the wet and dry crease recovery of the fabric were accompanied by a very small loss in tear strength; this is an important and unusual combination of properties, and it is believed to be due to the chemical structure of the sulfone employed.

When the procedure of Example 6 was repeated using a solution of the sulfone of Example 2 which had been diluted to 12% with water, the following results were obtained.

The wet pickup was 90%. The weight increase for the treated fabric was 5.3%, indicating that a 49% yield of the reaction product with the sulfone was obtained. The wet crease recovery of the treated cotton was 254 (compared to 149 for the untreated control).

bility, the physical properties, and particularly the wet properties, were greatly improved by the treatment without the serious losses in abrasion resistance which are generally encountered when regenerated cellulose fabrics are treated with crosslinking agents.

|  | Wet tensile [a] strength, lbs. | | Wet tear [b] strength, lbs. | | Wet crease [c] recovery, degrees | Flex abrasion,[d] cycles warp |
|---|---|---|---|---|---|---|
|  | Warp | Fill | Warp | Fill | | |
| Example 9 | 28 | 40 | 1.5 | 2.2 | 266 | 820 |
| Untreated control | 26 | 31 | 1.6 | 1.7 | 154 | 1,500 |

[a] Ravel Strip Method—ASTM-D-39-59.
[b] Elmendorf Method—ASTM-D-1424-59.
[c] Monsanto Method—AATCC 66-1959.
[d] ½ lb. head, 2 lb. toggle—ASTM-D-1175-55T.

The nitrogen content, sulfur content and physical properties of the treated fabrics were unchanged after repeated launderings.

EXAMPLE 7

A cotton fabric (80 x 80 print cloth) was impregnated on a laboratory padder with a solution containing 100 grams per liter of the crystalline product of Example 1 and 25 grams per liter of potassium bicarbonate (dissolved in a 2 to 1 mixture of water and acetone). The wet pickup was 82%. The fabric was framed to the original dimensions, dried, then heated in a curing oven at 150° C. for 2 minutes, then washed thoroughly and dried. The weight increase was 8.3%, indicating that a quantitative yield had been obtained in the reaction between the cotton cellulose and the sulfone. The physical properties of the treated fabric were excellent, and remained unchanged after a large number of launderings in a home type automatic washer.

|  | Warp tear [a] strength, lbs. | Crease recovery degrees [b] | |
|---|---|---|---|
|  |  | Wet | Dry |
| Example 7 | 40 | 236 | 269 |
| Untreated Control | 59 | 149 | 162 |

[a] Tested by the Ravel Strip Method (ASTM D-39-59).
[b] Tested by the Monsanto Method (AATCC 66-1959) expressed as the sum of results obtained in the warp and filling direction.

EXAMPLE 8

A sample of wool flannel was treated with a solution prepared by diluting the product of Example 2 with water to a concentration of 12.5% sulfone and adding 10 grams per liter of anhydrous potassium carbonate. The fabric was treated on a laboratory padder, adjusting the pressure of the rolls to obtain a 95% wet pickup. The treated fabric was framed to the original dimensions, dried, then heated in a curing oven at 120° C. for 30 minutes. The wool fabric was then thoroughly rinsed and dried. On washing in a home type automatic washer at 40–50° C., the treated fabric did not shrink or felt appreciably, while the area shrinkage of the untreated control sample was 8%. The tensile strength of the wool fabric was not decreased by the treatment, in contrast with shrinkproofing treatments commonly employed for wool fabrics, which are known to impair the tensile strength severely.

EXAMPLE 9

A spun rayon fabric was impregnated on a laboratory padder with the solution prepared in Example 2 to 90% wet pickup and dried. After drying, the sample was padded with a solution containing 5 grams per liter of sodium hydroxide, and allowed to stand wet at room temperature for 30 minutes. It was then neutralized, washed and dried. The weight increase was 16%, indicating a 70% yield in the reaction between the regenerated cellulose and the sulfone. The analysis of the treated fabric for sulfur and nitrogen gave results which were consistent with the weight increase observed. The ratio of sulfur to nitrogen in the treated fabric was 1.82 (calculated 64/28—2.3). The performance of this treated fabric was outstanding; the fabric had excellent flat drying properties and dimensional sta- The warp shrinkage of the treated fabric after 10 launderings was 2.5%, while the wrap shrinkage of the untreated control fabric was 17.5%.

EXAMPLE 10

(A) A sample of spun rayon fabric was impregnated on a laboratory padder with a solution containing 200 grams per liter of the crystalline product of Example 1 and 50 grams per liter of anhydrous potassium bicarbonate. The wet pickup was 94%. The fabric was framed to original dimensions, dried and heated in a curing oven for 2 minutes at 150° C. It was then rinsed thoroughly and dried. The weight increase obtained was 15.7%, corresponding to an 83% yield of the desired product. The crease recovery of the treated fabric was greatly improved, as shown by the following results:

|  | Crease Recovery | |
|---|---|---|
|  | Dry | Wet |
| Example 10(A) | 258 | 203 |
| Untreated control | 185 | 139 |

The treated fabric did not show appreciable shrinkage in laundering.

(B) When a filament rayon fabric was treated by the procedure of Example 10, the improvement in properties over the untreated control was also very great. For example:

|  | Tensile strength [a] warp, lbs., dry | Tear strength [b] warp, lbs., wet | Crease recovery [c] degrees | |
|---|---|---|---|---|
|  |  |  | Dry | Wet |
| Example 10(B) | 68 | 2.4 | 233 | 247 |
| Untreated control | 61 | 1.9 | 188 | 228 |

[a] Ravel Strip Method—ASTM-D-39-59.
[b] Elmendorf Method—ASTM-D-1424-59.
[c] Monsanto Method—AATCC 66-1959.

EXAMPLE 11

A cotton fabric (80 x 80 print cloth) was treated on a laboratory padder with a solution prepared by dissolving 200 grams of the product of Example 3 in 400 grams of acetone and adding 400 grams of water. The wet pickup was 60%. The fabric was dried, then treated with a 2% solution of sodium hydroxide and allowed to stand at room temperature wet for 1 hour. It was then washed and dried. The weight increase was 6.2%, indicating a 52% yield of the desired product. The wet crease recovery of the treated fabric was 236, compared with 145 for the untreated control fabric.

EXAMPLE 12

A spun rayon fabric was treated with the product of Example 3 according to the procedure of Example 11. The yield of the desired product was 78% (corresponding to an 8.5% weight increase). The treated fabric exhibited excellent properties, particularly with regard to crease recovery, flat drying, water resistance, and dimensional stability. For example, the thread count of the untreated fabric increased from (71 x 66) to (76 x 71) after ten launderings indicating substantial shrinkage, while the thread count of the treated fabric remained unchanged in the course of the ten launderings. The wet tensile strength of the untreated fabric in the warp direction decreased from 26 lbs. to 17 lbs. after 10 launderings and the dry warp tensile strength decreased from 46 lbs. to 33 lbs. The warp tensile strength of the treated fabric on the other hand (27 lbs. wet and 42 lbs. dry) remained unchanged after 10 launderings.

It is not intended that the scope of the claims appended hereto be limited to the examples and description set forth herein but rather that the claims be construed as encompassing all the features of patentable novelty which reside in the present invention, including all features which are or may be treated as equivalents thereof by those skilled in the art to which the invention pertains.

We claim:
1. The compound corresponding to the structure:

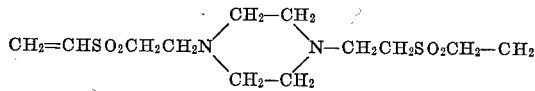

References Cited
UNITED STATES PATENTS 3,441,954  4/1969  Tesoro et al. _____ 8—116.2

ALEX MAZEL, Primary Examiner

R. V. RUSH, Assistant Examiner

U.S. Cl. X.R.

260—248, 251, 309.7, 456

UNITED STATES PATENT OFFICE
CERTIFICATE OF CORRECTION

Patent No. 3,549,638                    Dated December 22, 1970

Inventor(s)  Giuliana C. Tesoro and Frank V. Mattei

It is certified that error appears in the above-identified patent and that said Letters Patent are hereby corrected as shown below:

Column 10, line 4 (in claim 1) please correct the formula as follows:

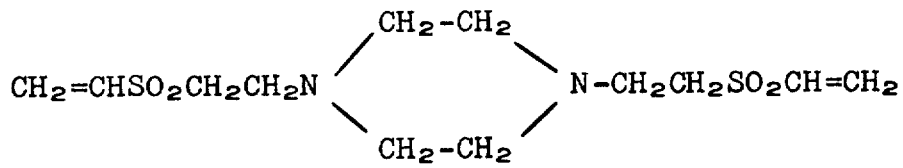

Signed and sealed this 4th day of May 1971.

(SEAL)
Attest:

EDWARD M. FLETCHER, JR.                WILLIAM E. SCHUYLER, JR.
Attesting Officer                      Commissioner of Patents